United States Patent [19]
Erickson et al.

[11] Patent Number: 5,921,261
[45] Date of Patent: Jul. 13, 1999

[54] DAMPENING RESONANCE IN A FLOW REGULATOR

[75] Inventors: Barbara J. Erickson, Holly; Gerrit V. Beneker, Algonac; Charles A. Detweiler, Durand; Daniel L. DeLand, Davison, all of Mich.

[73] Assignee: Eaton Corporation, Cleveland, Ohio

[21] Appl. No.: 08/853,015

[22] Filed: May 8, 1997

[51] Int. Cl.[6] ................................................ F16K 31/40
[52] U.S. Cl. .......................... 137/1; 251/30.02; 251/53; 251/48
[58] Field of Search .................... 251/53, 61.2, 61.1, 251/61.4, 30.01, 30.02, 30.03, 48; 137/1; 123/520; 92/143

[56] References Cited

U.S. PATENT DOCUMENTS

| | | | |
|---|---|---|---|
| 2,965,117 | 12/1960 | Gallacher | 251/53 X |
| 3,945,401 | 3/1976 | Greenwood | 137/627.5 |
| 4,084,539 | 4/1978 | Schmidt . | |
| 4,596,264 | 6/1986 | Gladstone, et al. . | |
| 5,429,099 | 7/1995 | DeLand | 123/520 |
| 5,520,215 | 5/1996 | Haboush . | |
| 5,749,349 | 5/1998 | Detweiler et al. | 123/520 |
| 5,817,925 | 10/1998 | Cook et al. | 123/520 X |
| 5,853,018 | 12/1998 | DeLand et al. | 251/30.02 X |

FOREIGN PATENT DOCUMENTS

| | | |
|---|---|---|
| 0 522 434 A1 | 1/1993 | European Pat. Off. . |
| 2208 491 | 8/1973 | Germany . |
| 2 136 095 | 9/1984 | United Kingdom . |

*Primary Examiner*—Kevin Lee
*Attorney, Agent, or Firm*—Roger A. Johnston

[57] ABSTRACT

A diaphragm type flow regulator has an electrically operated bleed valve to control fluid signal pressure in a chamber on one side of the diaphragm. A valve member mounted on the opposite side of the diaphragm is moved, in response to the difference in pressure between the signal chamber and a flow regulating chamber, with respect to a valve seat for controlling flow of a compressible fluid between an inlet and outlet in the flow regulating chamber. An auxiliary chamber communicates with the flow regulating chamber through a restricting orifice which function to dampen or attenuate diaphragm vibration caused by pressure pulses or transients which may occur in the fluid supply conduit. In one arrangement the auxiliary chamber is formed as part of the regulator housing. In other arrangements, the auxiliary chamber is formed as part of a separate fitting attached to the regulator flow regulating chamber inlet.

8 Claims, 4 Drawing Sheets

DAMPENING RESONANCE IN A FLOW REGULATOR

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to flow regulators and particularly flow regulators employed for compressible fluid flow control and more particularly relates to such regulators which are supplied with a fluid pressure signal which is modulated by an electrically remote controlled bleed valve for controlling the pressure applied to one side of a pressure responsive member. Regulators of this type typically have a moveable valve member attached to the opposite side of the pressure responsive member for controlling flow over a valve seat of the compressible fluid to be flow regulated.

Regulators of this type are utilized in motor vehicle fuel vapor emission control systems for controlling flow from a fuel vapor purge canister for communication with the charge air inlet of the vehicle engine. Purge control regulators of this type are known to utilize the engine manifold depression or vacuum as a fluid pressure signal source for the regulator.

In such known fuel vapor purge system flow regulators, problems have been experienced at certain levels of pressure in the vapor canister and at certain flow conditions in a connecting conduit between the canister and the flow regulator valve inlet. For a given length of conduit, pulses and rarefactions in the flow conduit have produced a standing wave which causes vibration of the pressure responsive member which in turn has produced a resonance in the conduit with the resultant tuning of the conduit. This resonating of the conduit between the fuel vapor canister and the regulator valve has produced an audible phenomenon known as "hooting" which is an undesirable noise in the system from the vehicle occupants' standpoint.

Thus, it has been desired to provide a way or means of dampening pressure pulsations or rarefactions in the inlet of a flow regulator and to provide such dampening in a way that is low in manufacturing costs and does not adversely affect the function or calibration of the flow regulator.

BRIEF SUMMARY OF THE INVENTION

It is an object of the present invention to provide a way of dampening pressure pulses and rarefactions in the inlet of a flow regulator of the type employing a pressure responsive member moveable in response to differential pressure thereacross for controlling movement of a flow regulating valve member.

It is a further object of the present invention to provide a way of dampening pressure pulsations in the inlet of a flow regulator having a pressure responsive member moveable in response to differential pressure thereacross for moving a flow regulating valve member with the pressure differential controlled by a remotely actuated electrically operated bleed valve for controlling fluid pressure on one side of the pressure responsive member.

It is a further object of the present invention to provide a flow regulator having a pressure responsive member moveable in response to a differential pressure thereacross for moving a flow regulating valve for controlling flow between the regulator inlet and an outlet with an auxiliary chamber connected by a restricting orifice to the flow regulating chamber on one side of the diaphragm.

The present invention provides a solution to the above-described problem and has a pressure responsive member in the form of a flexible diaphragm dividing a housing into a fluid pressure signal chamber and a fluid pressure flow regulating chamber with the pressure in the signal chamber controlled by an electrically operated bleed valve with the signal chamber connected to a source of fluid pressure which may in an automotive fuel vapor purge system be subatmospheric such as engine inlet manifold depression. The flow regulating chamber side of the pressure responsive member includes a valve member moveable with respect to a valve seat for controlling flow between an inlet and outlet of the flow regulator chamber, with the movement of the valve member determined by the differential pressure between the signal chamber and the flow regulating chamber acting upon the pressure responsive member. An auxiliary dampening chamber is connected to the flow regulating chamber via a restricting orifice to provide fluid pressure dampening of pressure transients.

The present invention thus provides a flow regulator for controlling flow of compressible fluid, as for example, flow from a fuel vapor purge canister to an engine air inlet of the type which utilizes a pressure responsive member such as the piston or diaphragm with a fluid pressure signal control chamber on one side of the pressure responsive member and a flow regulating chamber on the opposite side of the pressure responsive member. The pressure in the fluid pressure signal chamber is controlled by supplying a fluid pressure signal thereto from a convenient source such as engine manifold depression and controlling atmospheric bleed to the chamber by means of an electrically operated bleed valve which may be controlled by a pulse modulated electrical control signal. The pressure responsive member has a valve attached thereto for controlling flow over a valve seat disposed between an inlet and an outlet passage of the flow regulating chamber; and, the valve movement is dependent upon the differential pressure between the two chamber acting across the pressure responsive member. Pressure spikes or transients applied to the inlet of the flow regulating chamber are attenuated through a restricting orifice to an auxiliary chamber thereby damping pulsations of the pressure responsive member caused by pressure waves or pulses in the regulating chamber. In one embodiment, the auxiliary chamber is attached to the regulator housing structure; and, in another embodiment, the auxiliary chamber is formed in a Tee-fitting located in the regulator inlet line and in a variation, the Tee-fitting is attached to the regulator inlet.

DETAILED DESCRIPTION OF THE INVENTION

Figure 1:
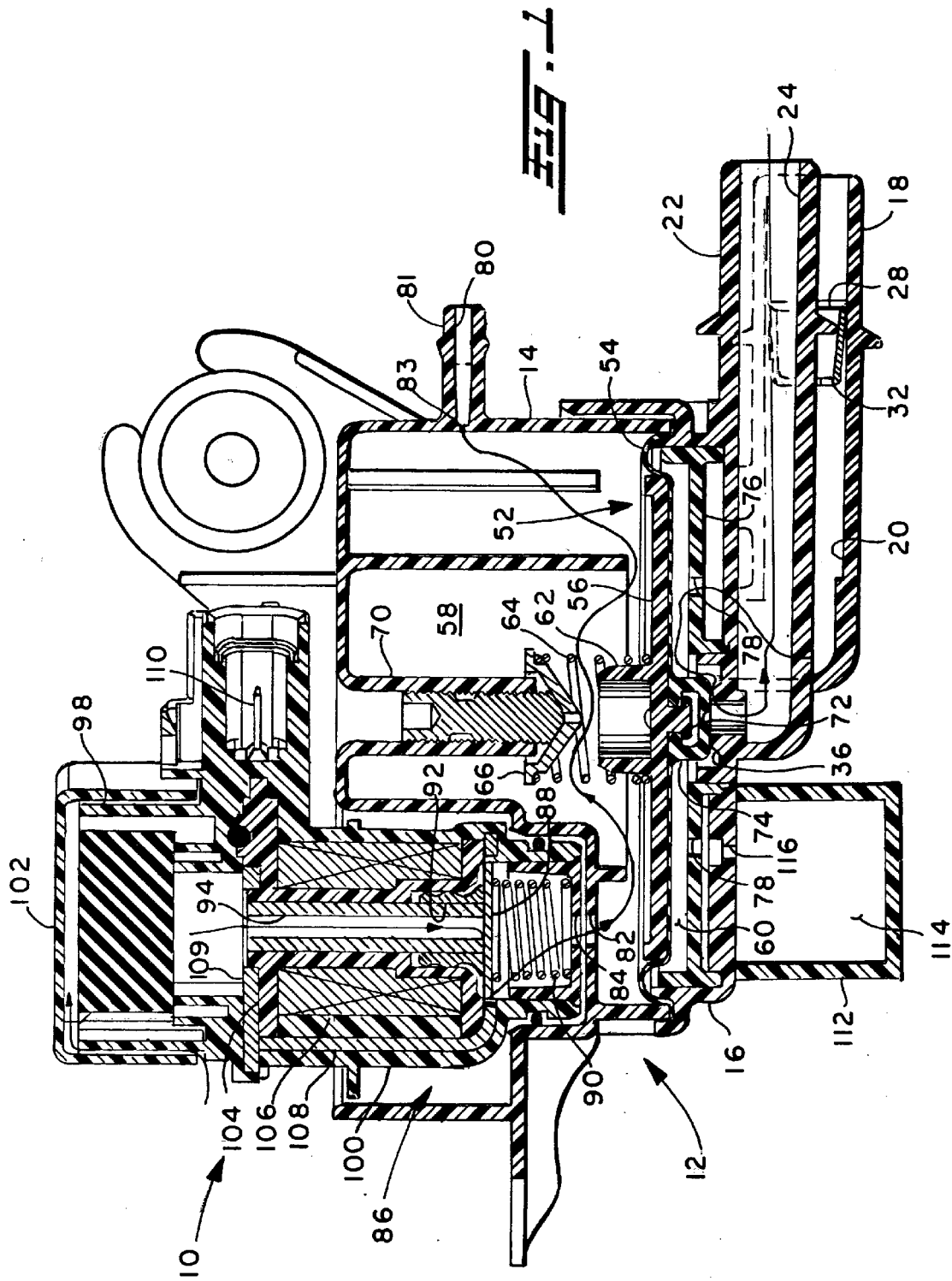
FIG. 1 is a cross-section of the flow regulator of the present invention.
Figure 2:
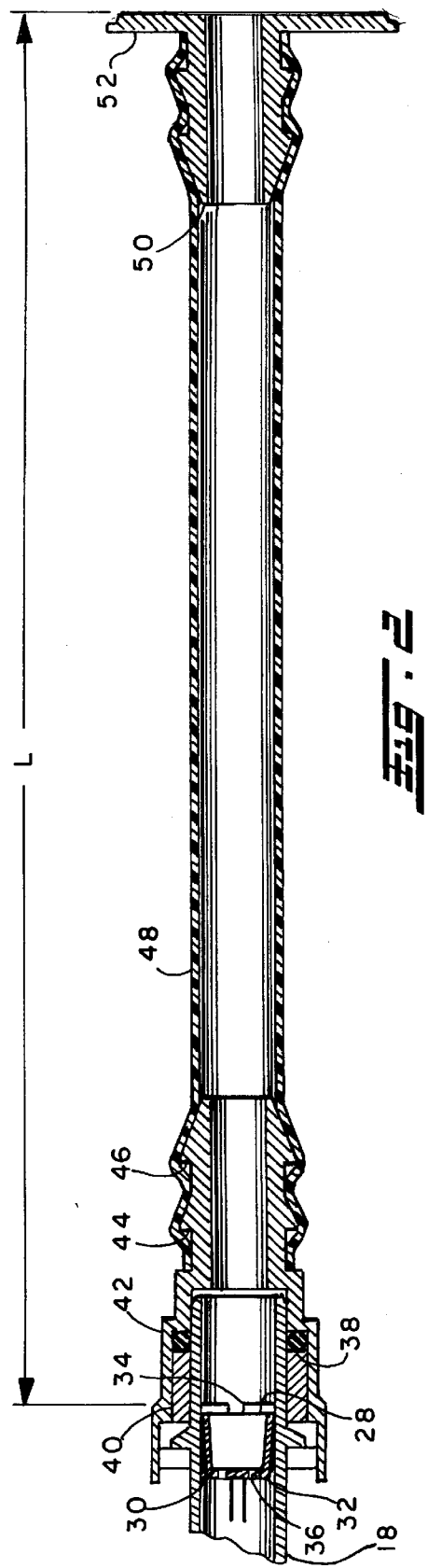
FIG. 2 is a sectional view of the supply tube connected to the flow regulator inlet.

Referring to FIGS. 1 and 2, the flow regulator of the present invention is indicated generally at 10 and has a housing indicated generally at 12 which includes an upper housing shell 14 attached to a lower housing shell 16 which includes an inlet fitting 18 defining therein an inlet passage 20 and an outlet fitting 22 which defines an outlet or discharge passage 24 which communicates with a valve seat 26. Inlet passage 20 has disposed therein a restrictor 32 which has a plurality of radially extending grooves or slots 28 formed therein which communicate with an annular passage 30 which is defined by press fitting the restrictor member 32 into the passage 20. Restrictor 32 also has a central aperture 34 at its inlet end which communicates with a plurality of smaller apertures 36 provided at the outlet end thereof.

Referring to FIG. 2, a typical application of the invention to an automotive fuel vapor purge system is shown, wherein inlet fitting 18 has an annular seal 38 received thereover and a backup support ring 40 provided adjacent thereto with an adaptor fitting 42 received thereover. Fitting 42 preferably has a plurality of annular barbs 44, 46 provided adjacent the right hand end thereof The barbs 44, 46 have received thereover one end of a flexible supply tube or hose 48 with the opposite end of the hose 48 received over a similarly barbed fitting 50 provided on the wall of a supply source such as a fuel vapor purge canister 52. It will be understood that the effective length of the hose denoted by reference character 1 in FIG. 2, i.e., the distance between restrictor 32 and the inner surface of the wall 52, is subject to standing waves as a result of pressure pulses in the supply system. These standing waves over the length L can produce a resonance of the system within the regulator as will hereinafter be described.

Referring to FIG. 1, a pressure responsive means indicated generally at 52 includes a flexible diaphragm 54 preferably formed of elastomeric material and sealed about its periphery between the upper shall 14 and the lower shell 16; and, pressure responsive means 52 includes a piston or backing plate member 56 disposed on the upper surface of the diaphragm 54. The piston 52 and diaphragm thus divide the housing 12 into an upper signal pressure chamber 58 and a lower fluid flow regulating pressure chamber 60.

The piston 56 has a tower or upstanding guide portion 62 provided centrally thereon which has received thereover one end of a preload coil spring 64, with the upper end of the spring registered against a seating washer 66. Washer 66 is supported on the lower end of an adjustment screw threadedly received in a depending tubular support portion 70 formed in the upper housing shell 14.

The piston 56 has on the undersurface thereof a depending portion 72 over which is received a valve obturator 74 which is preferably integrally formed as one piece with the elastomeric diaphragm 54. The valving member or obturator 74 is operable to move with respect to stationary valve seat 26 and to seat thereupon in the closed condition.

The flow regulating chamber 60 has provided therein a flow dampener in the form of a disc-shaped member 76 which has provided therethrough a plurality of flow restricting orifices 78.

The pressure in fluid signal chamber 58 is controlled by a fluid pressure signal applied through inlet passage 80 and an orifice 83 formed in the wall of upper housing shell 14 and communicates with chamber 58 exteriorly through a fitting 81 provided on housing shell 14. The fluid pressure signal provided in passage 80 may be provided from any convenient source (not shown) such as, for example, by connection to an engine inlet manifold for the subatmospheric or vacuum pressure provided therein.

Another port 82 is formed in the wall of housing shell 14; and, port 82 communicates with a corresponding port 84 provided at one end of an electrically operated valve indicated generally at 86 which in the illustrated embodiment is disposed directly above port 82. The valve 86 includes a magnetic armature plate 88 biased upwardly by a spring 90 to close against one end of a valve seat member 92 received over the end of a tubular pole piece 94 which communicates, through a filter 96, with an annular outlet passage 98 provided between the upper end of valve body 100 and a protective cap 102.

Valve seat 92 is received in one end of a bobbin 104 which has wound thereabout a solenoid coil 106 which has thereover an L-shaped pole frame 108 capped with a washer 109 which are operative for conducting magnetic flux externally about the coil. Upon energization of the coil, tube 94 serves as an armature to move plate 88 toward valve seat 92 which reduces venting of the chamber 58 through port 82. Coil 106 is connected to terminal connectors such as connector 110 for external electrical connection thereto. In the present practice, valve 86 receives an electrical signal to control the opening of the valve to permit flow through bleed port 84 to control the pressure in chamber 58.

In the presently illustrated embodiments for an automotive fuel vapor purge application, signal port passage 80 is connected to a source of subatmospheric pressure or vacuum such as the engine intake manifold. Signal orifice 83 controls the rate at which air within chamber 58 is evacuated through passage 80 Air is allowed to flow into chamber 58 through inlet ports 82 in the housing shell 14 and port 84 in the end of the electrically operated vacuum regulator 86 (EVR).

The EVR includes a magnetically permeable armature plate 88 biased upwardly by a spring 90 to close against one end of a non-magnetic valve seat 92. The magnetically permeable pole piece 94 is assembled into valve seat 92 to define a magnetic working air gap between the armature 88 and the pole piece 94. Valve seat 92 is preferably pressed into the bore of bobbin 104. The upper side of armature 88 is thus exposed to atmospheric pressure through a central hole in pole piece 94, filter 96 and inlet passage 98.

With vacuum applied to signal port passage 80 air will be evacuated from chamber 58. When the pressure differential applied to the armature 88 is sufficient to overcome the preload of spring 90, flow will be allowed between armature 88 and valve seat 92 thereby maintaining a bias vacuum within chamber 58. In one present automotive fuel vapor purge system application, a vacuum of 33 mm Hg is maintained in chamber 58.

When coil 106 is energized, armature 88 is magnetically attracted to pole piece 94. As the armature is moved closer to valve seat 92, flow of atmospheric air is restricted and a greater vacuum is drawn in chamber 58 before the pressure differential is enough to unseat armature 88 allowing subatmospheric air to flow into chamber 58. The current through coil 106 is thus controlled to control the vacuum in chamber 58.

Referring to FIGS. 1 and 2, the housing 12, and preferably lower shell 16 has a portion 112 formed thereon which forms an auxiliary chamber 114 which communicates with regulating chamber 60 through restricting orifice 116. Orifice 116 and chamber 114 serve to attenuate or dampen transient pressure pulses in inlet 20 which could cause diaphragm and piston 52 to resonate and create a standing wave in length L of the fluid supply hose 48 so as to cause an audibly discernable acoustical phenomenon known as "hoot".

The portion 112 of housing 12 may either be attached as a separate member or may be formed integrally with lower shell 16.

Figure 3:
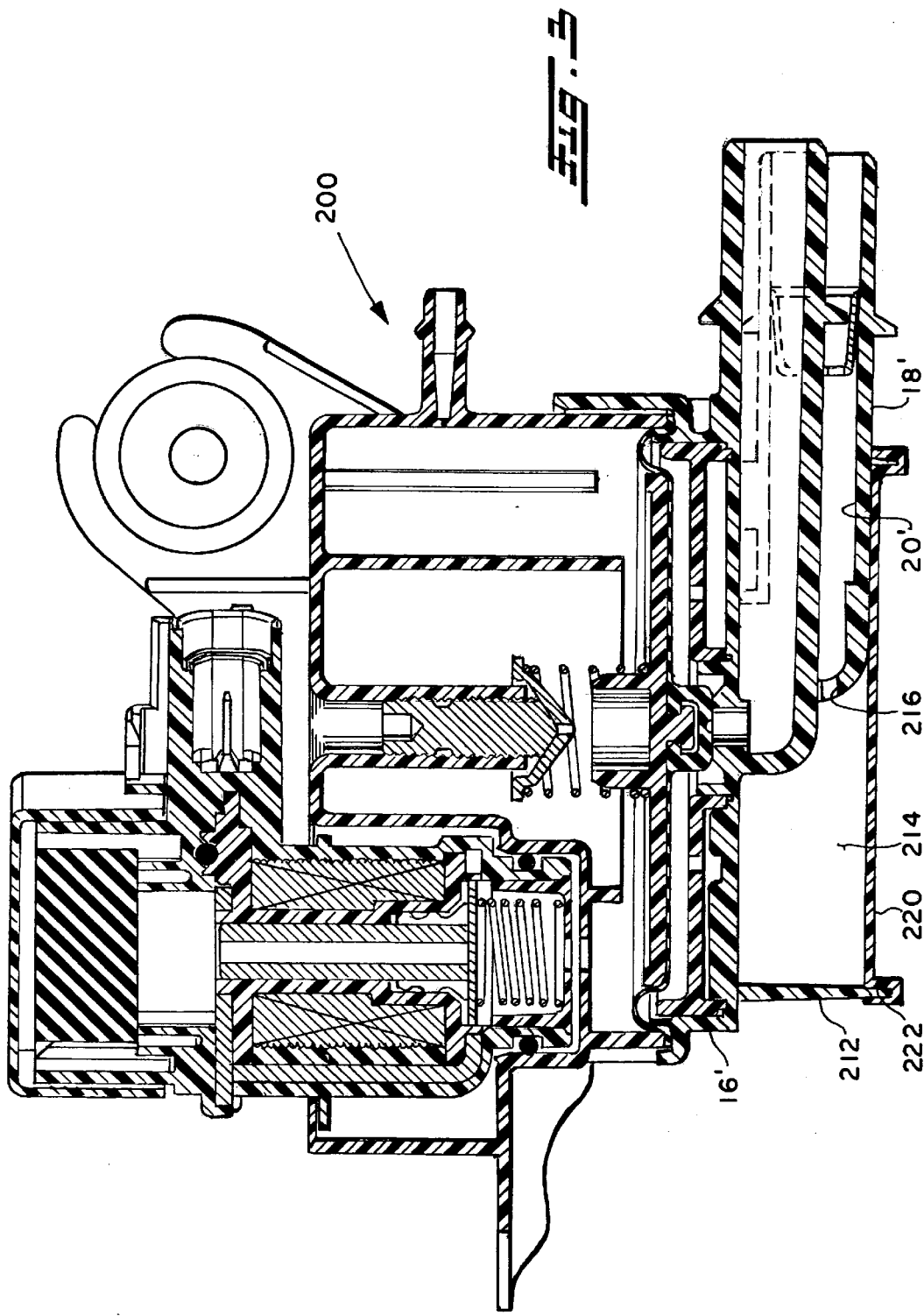
FIG. 3 is a view similar to FIG. I of an alternate embodiment of the present invention.

Referring to FIG. 3, an alternate embodiment of the flow regulator is indicated generally at 200 and has the auxiliary chamber 214 thereon formed by a wall portion 212 attached to the housing lower shell 16'. The wall portion 212 is formed about a portion of inlet fitting 18' and the chamber 214 communicates with the inlet passage 20' within fitting 18' by means of orifice 216 provided in the end of the fitting 18'.

The chamber 214 is covered by a cover plate or closure 220 which has a circumferential groove 222 formed therein which groove has received therein the rim of the wall 212. The cover 220 is secured to the wall 212 preferably by weldment such as, for example, spin welding, ultrasonic or other suitable technique. It will be understood that the function and structure of the embodiment 200 of FIG. 3 is otherwise identical to that of the embodiment of FIG. 1.

Figure 4:
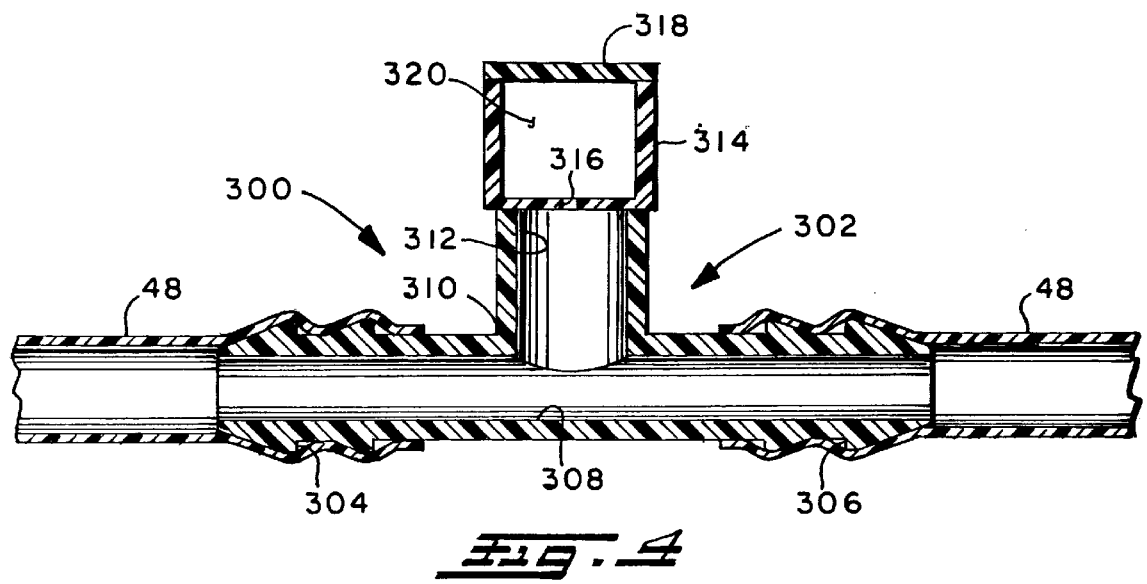
FIG. 4 is a cross-section of another embodiment of the invention showing the auxiliary chamber formed in a Tee fitting positioned in the inlet tube of FIG. 2; and, FIG. 5 is a view similar to FIG. 4 showing an alternate Tee configuration formed as a fitting attached to the regulator inlet.

Referring to FIG. 4, another embodiment of the invention is indicated generally at 300 wherein the inlet tube 48 (see FIG. 2) has been cut and a Tee-fitting 302 having a barbed fitting 304 inserted in one portion of the conduit 48 which is connected to the inlet fitting 42 over barbs 44, 46. An oppositely disposed in-line fitting 306 having barbs thereon is inserted in the remaining portion of conduit 48 which is connected to the canister fitting 50. Fittings 304 and 306 are connected by through passage 308; and, a right angle fitting 310 is attached to fitting 302 and has a passage 312 formed therein which communicates with and intersects passage 308. The end of passage 312 has a generally cup-shaped capsule 314 attached thereto with the closed end having formed therein a flow limiting orifice 316; and, the capsule 314 is closed by a cover 318 which forms auxiliary chamber 320. Chamber 320 communicates through orifice 316 with passage 312 and with the intrior 308 of the Tee 302 and the interior of conduit 48. In the presently preferred practice of the invention, fitting 302, capsule 314 and cover 318 are formed of suitable plastic material and are assembled by any convenient technique such as ultrasonic weldment. The embodiment 300 of FIG. 4 thus provides a convenient way of adding the auxiliary chamber 320 to an existing regulator valve assembly without the need for reworking the housing of the regulator.

Figure 5:
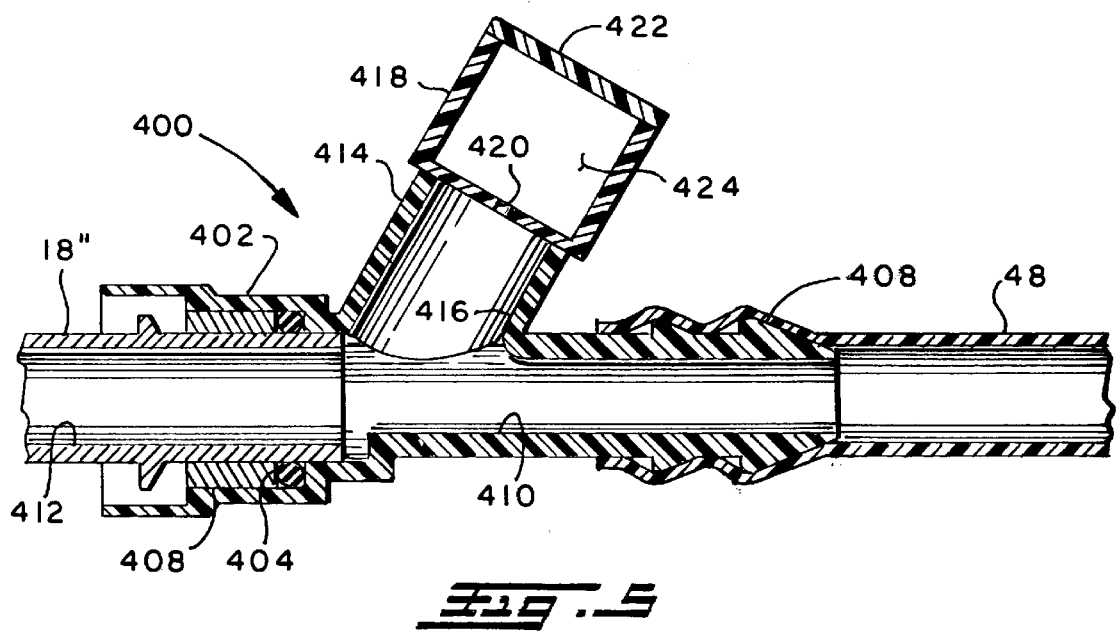

Referring to FIG. 5, another embodiment of the invention is illustrated generally at 400 wherein the inlet tube 18" of an existing regulator has provided thereover a fitting 402 which is sealed by a suitable resilient seal ring 404 and backing ring 406 provided on the inner bore of fitting 402. An oppositely disposed barbed fitting 408 has the inlet conduit 48 received thereover and sealed thereon, with the fitting 408 having the inner bore 410 thereof in line with and communicating with the interior 412 of inlet fitting 18". A third fitting 414 is attached to fittings 402 and 408 and has the interior bore 416 thereof communicating with the interior passage 410 of fitting 408 and also with the inlet passage 412. The fitting 414 intersects the passage 410 at an acute angle as illustrated in FIG. 5.

Fitting 414 has disposed on the upper open end thereof a capsule 418 which has a closed end thereof communicating with interior passage 416 through a flow limiting orifice 420. Capsule 418 is closed by a cover 422 which forms within the capsule 418 the auxiliary chamber 424 which communicates with the interior passage 416 and passage 412 through the flow limiting orifice 420.

The embodiment 400 of the FIG. 5 thus provides the auxiliary chamber in a T-shaped fitting which may be added to an existing regulator without the necessity of reworking the regulator, and, the conduit 48 from the surge tank fitting 50 is easily attached to the Tee fitting 408. In the presently preferred practice, the Tee fitting comprising fittings 402, 408 and 414 and the capsule 418 and cover 422 are formed of plastic material joined preferably by weldment.

It will be understood that the chamber 320 of the embodiment 300 and the chamber 424 of the embodiment 400 function in identically the same manner as chamber 214 of the embodiment of FIG. 3 and chamber 114 of the embodiment of FIG. 1.

The present invention thus provides a unique and novel technique for eliminating resonance in the fluid supply tube of a flow regulator employing a pressure responsive piston or diaphragm by providing an auxiliary chamber which communicates with the flow regulating chamber through a restricting orifice and which is effective to dampen out pressure pulsations or transients in the flow regulating chamber sufficiently to prevent resonance in the inlet supply conduit. In one arrangement, the auxiliary chamber is formed as a part of the regulator housing; and, in other embodiments, the auxiliary chamber is formed as part of a Tee-shaped fitting incorporated in the regulator inlet conduit.

Although the present invention has hereinabove been described with respect to the illustrated embodiments, it will be understood that the invention is capable of modification and variation and is limited only by the following claims.

We claim:

1. A resonance damped compressible fluid flow regulator for compressible fluid comprising:
   (a) a housing;
   (b) means for responding to pressure including a member forming on one side thereof in association with said housing a first fluid pressure chamber and a second chamber on a side thereof opposite said one side;
   (c) said housing including a fluid pressure signal port to said first chamber, said signal port adapted for connection to a fluid pressure signal source, and a bleed port communicating said first chamber with the atmosphere;
   (d) means for selectively controlling flow through said bleed port;
   (e) said housing including a fluid flow inlet port to said second chamber, said inlet port adapted for connection to a source of fluid flow to be regulated, said housing including an exhaust port to said second chamber;
   (f) said means for responding to pressure operable in response to the difference in pressure between said first and second chamber for controlling flow through said exhaust port and including a valve obturator and a valve seat, said obturator moveable by said means for responding to pressure; and,
   (g) said housing defining an auxiliary chamber and a restrictive orifice communicating said auxiliary chamber with said second chamber, wherein pressure transients in said second chamber are dampened by flow through said restrictive orifice.

2. The flow regulator defined in claim 1, wherein said means for selectively controlling flow through said bleed port includes an electrically operated valve.

3. The flow regulator defined in claim 1, wherein said means for responding to pressure includes a flexible diaphragm.

4. The flow regulator defined in claim 1, wherein said means for selectively controlling flow through said bleed port includes a solenoid operated valve.

5. The flow regulator defined in claim 1, wherein said valve seat is formed in said fluid flow inlet port.

6. The flow regulator defined in claim 1, wherein said auxiliary chamber is formed by a cavity in a body member with a closure member secured thereon by weldment.

7. A method of dampening resonance in a fluid flow regulator comprising:

(a) providing a moveable pressure responsive member and forming a fluid pressure control chamber on one side thereof and forming a flow control pressure chamber on the side opposite said one said;

(b) connecting a fluid pressure signal source to said control chamber and controlling the pressure in said control chamber;

(c) connecting said flow control chamber to a source of compressible fluid to be flow regulated and porting said flow control chamber to a flow discharge line;

(d) moving an obturator connected to said pressure responsive member and valving said porting with said obturator;

(e) forming an auxiliary chamber and porting said auxiliary chamber and communicating said porting with said flow control chamber; and, (f) restricting flow between said auxiliary chamber and said flow control chamber and dampening pressure transients therein.

8. The method defined in claim 7, wherein the step of forming an auxiliary chamber includes disposing a separate fitting in the inlet of said flow control chamber.

* * * * *